G. H. BENJAMIN.
METHOD OF PRODUCING CARBONIC OXID.
APPLICATION FILED JUNE 7, 1911.
1,225,396.
Patented May 8, 1917.
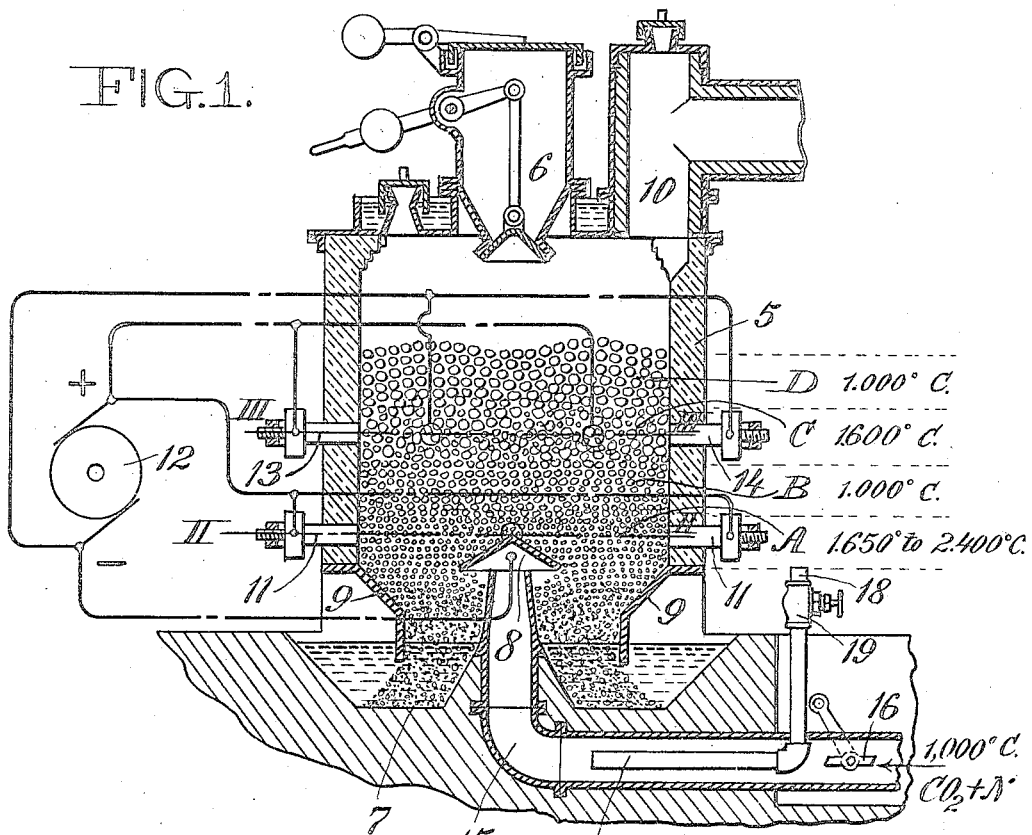
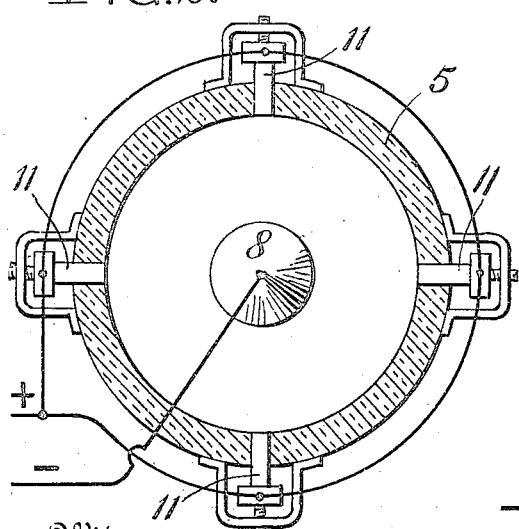
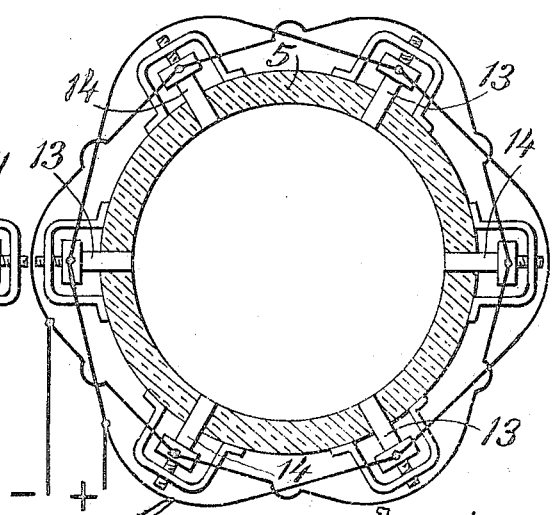

UNITED STATES PATENT OFFICE.

GEORGE HILLARD BENJAMIN, OF NEW YORK, N. Y.

METHOD OF PRODUCING CARBONIC OXID.

1,225,396.  Specification of Letters Patent.  Patented May 8, 1917.

Application filed June 7, 1911. Serial No. 631,762.

*To all whom it may concern:*

Be it known that I, GEORGE HILLARD BENJAMIN, a citizen of the United States, residing at New York city, in the county and State of New York, have invented certain new and useful Improvements in Methods of Producing Carbonic Oxid, of which the following is a specification.

Considered broadly, my invention has for its purpose the free production of carbonic oxid (CO) and the formation of a non-clinkering fluid slag.

A further object of my invention is to save such an amount of coal (which in an ordinary producer is burned) as is required to produce the temperature necessary to disassociate carbon (C) from the coal or to disassociate $CO_2$, when such $CO_2$ is introduced in the form of waste gases.

By reason of my improved method of operation, free evolution of carbonic oxid is obtained, the furnace bosh is kept clean, a valuable slag fertilizer is obtained, and the cost of operation is reduced.

I will first describe the construction of the producer and subsequently, the methods of operation which may be employed.

I wish it understood that the drawings merely indicate such a general construction for the producer and for the electrodes, as may be used, and that if the shape of the producer is changed the position of the electrodes would necessarily be changed, as well as the relation of the other parts. What I wish to have understood is that the drawings accompanying this application, are in a sense diagrammatic, and intended to illustrate the principles involved, and merely one type of construction which may be employed.

In the drawings, Figure 1 is a vertical section. Fig. 2, a plan view on the line II—II of Fig. 1. Fig. 3, a plan view on the line III—III of Fig. 1.

In the drawings, 5 indicates the shell of the producer. 6, coal hopper; 7, water hearth; 8, delivery device for $CO_2$ and air; 9, bosh; 10, CO delivery flue.

The construction of the producer, so far as relates to its shell, water hearth, delivery device for $CO_2$ and air, bosh, etc., may be of any known construction.

I will now describe the novel features of construction. Located above the bosh and approximately in what is known as the zone of sensible combustion of the producer, are a series of electrodes 11, connected to one terminal of a dynamo 12, the other terminal of the dynamo being connected to the $CO_2$ and air delivery device 8, which should have a carbon or other refractory surface. The electrodes 11 are adjustable, as is usual in furnace construction using electrodes, so as to adjust the resistance, etc. Situated above the electrodes 11 and below the CO delivery flue 10, are a second series of electrodes 13 and 14; the electrodes 13 are connected to one terminal of the dynamo 12 and the electrodes 14 to the other terminal.

15 indicates a flue through which hot products of combustion, $CO_2$, may be discharged into the delivery device 8; 16, valve in such flue. 17, a flue, the major portion of which is within the flue 15, but communicating with the atmosphere through an opening 18, and through which atmospheric air, hot or cold, may be introduced into flue 15. 19, valve in such flue.

On the vertical section, Fig. 1, I have indicated that the interior of the producer is divided into four zones; A, that of high temperature, *i. e.*, from 1650° to 2400° centigrade. B, that of low temperature, *i. e.*, approximately 1000° centigrade. C, that of high temperature, *i. e.*, approximately 1600° centigrade. D, that of low temperature, *i. e.*, approximately 1000° centigrade.

This producer may be operated by different methods, depending somewhat upon the characteristics of the coal which is to be disassociated into gas, character of introduced flux, etc.

*Example 1—(The simplest method).*—The coal being discharged into the producer, hot products of combustion ($CO_2+N$) which have a temperature of from 1000° to 1200° C. are caused to flow into the producer through the flue 15 and be distributed through the delivery device 8. These products of combustion, heat the coal in the zone A to a high temperature and in the successive superior zones to lower temperatures. As it requires approximately 1600° to disassociate $CO_2$, the temperature in excess of that imparted by the introduced heated products of combustion, *i. e.*, 1000° to 1200°, is obtained from the temperature due to the passage of the electric current from the electrodes 11 to the delivery device 8, or negative electrode, as it may be termed. The 1650° temperature in the zone A heats the coal above it to approximately 1000° C. which will effect the breaking down of the coal and the separation of the contained carbon and ash. The $CO_2$ passing through the zone A and highly heated, is split up and combines with the free carbon to form $2CO$. The CO thus formed flows through the zones C—D and out of the flue 10.

As it may happen that the coal be of a character in which the carbon is freely separated under the temperatures to which it is subjected, rapidity of action of the producer can be increased by introducing free air, hot or cold, through the flues 15 and 17. Thus the CO passing out of the flue 10 is derived from the decomposition of $CO_2$ and its recombination with C and the originally formed CO from the free carbon derived from the coal and the air introduced through the flues 15 and 17.

As in all gas producers, a certain amount of gas will leak along the sides of the walls of the producer, and as this gas is mainly $CO_2$, provision is made, through the employment of the second set of electrodes and a second free carbon zone, for breaking up all $CO_2$ and effecting combination with the free carbon or free oxygen which passes through or from the zones A and B.

In practice I have found that if the temperature of the zones A and B is maintained practically constant (as it can be by regulating the amount of hot products of combustion, air and the electric temperature) the slag formed will be practically fluid and will continuously flow on to the hearth of the producer. As is well known, the slag consists chiefly of silica, phosphorous pentoxid, sulfur, traces of alumina, etc. Clinkering results from variations of temperature in the zone A and consolidation of the silica. If the temperature of the zone A is maintained practically constant, there will be no clinker.

*Example 2.*—Where the slag produced is high in silica, I have found it advisable, in practice, to charge into the producer with the coal, calcium fluorid ($CaF_2$). This material causes the slag to run very freely.

*Example 3.*—Where it is desired that a basic slag shall be produced which may be utilized as a fertilizer and which will be very fluid, I introduce into the producer, carbon in the form of coke finely pulverized, and lime. As these bodies pass through the zone A, they combine primarily to form calcium carbid ($CaC_2$), and secondarily to form compounds such as silicon carbid, calcium phosphid, sulfur carbid, and other bodies which have not been identified, but which collectively form a soluble fertilizer. Under the conditions mentioned it will be necessary to raise the temperature in the zone A, above that specified, i. e., 1650° C., to such an amount, i. e., approximately 2400° C. as is required to bring about the specified combinations. This can be accomplished by increase of current flow between the terminals of the dynamo and across the resistance medium, i. e., coal in zone A.

*Example 4.*—I may introduce carbon, lime, feldspar, magnesium, aluminum, or in fact any bodies which will unite at a temperature between 1600° and 2400°.

It will be observed that in a producer such as described, utilizing the methods set forth, that the temperature necessary to effect the breaking down of the $CO_2$ and the formation of $2CO$, is obtained without destroying any appreciable amount of coal to produce sensible combustion. In practice, but one system of electrodes (i. e. those in the A zone) are required. Two however, may be used in very deep producers, as illustrated, one in the A zone and the other in the C zone.

In this specification I have endeavored to explain, as far as possible, the theoretical conditions governing the action in the different zones. I wish it understood, however, that I do not in any wise bind myself to the correctness of the statements, as it is extremely difficult, if not impossible, to determine the actual chemical reactions which take place, where the temperatures produced are due wholly or in part to the action of an electric current passing through a resistance medium.

I make no claim in this application to the slag produced under Examples 2, 3 and 4, as a fertilizer, reserving to myself the right to file a separate application covering this feature of my invention.

Having thus described my invention, I claim:

1. The herein described process of producing CO which consists in creating a zone of high temperature in a body of coal in a producer by the action of highly heated waste furnace gases and air, thereby causing the evolution of $CO_2$; and then subjecting the $CO_2$ to the high temperature effects of an electric current between electrodes so disposed as to use the coal as a resistance medium, whereby the $CO_2$ is disassociated and combined with carbon to form $2CO$.

2. The herein described process of producing CO, which consists in disassociating the coal in the producer by the high temperature effects of mixed furnace gases and air thereby setting free $CO_2$, then disassociating the $CO_2$ by the high temperature effects of an electric current transmitted through a portion of the coal in the producer, whereby the disassociated gas will combine with carbon to form $2CO$.

3. The herein described process of producing CO, which consists in heating a body of coal contained in a producer by the introduction of waste products of combustion and air to a sufficiently high temperature to disassociate the coal to produce CO, and simultaneously heating the coal in the producer in a zone to a sufficiently high temperature by the passage of an electric current across said zone, using the coal as a resistance medium, to disassociate the $CO_2$ passing said zone and form $2CO$ and to compensate for the lowering of the temperature in the furnace due to the endothermic action taking place in converting $CO_2$ into $2CO$.

4. The herein described process of producing CO, which consists in introducing under a body of coal in a producer, highly heated products of combustion and air, whereby the coal is heated to a point sufficiently high to partially decompose the coal and set free CO; causing a current of electricity to traverse the fuel in the furnace in a zone, whereby said fuel is heated to a high temperature and rendered incandescent whereby the $CO_2$ carried by the products of combustion and the $CO_2$ set free by the combining action of the air with the fuel in the incandescent zone are converted into $2CO$.

5. The herein described process of producing CO, which consists in introducing highly heated products of combustion containing $CO_2$ and N under a body of coal in a producer, whereby the coal is primarily heated to a point at which it will give off a certain amount of CO; causing a current of electricity to traverse the coal in the producer disposed in a horizontal zone whereby the fuel in the zone is rendered incandescent, causing the air introduced with the products of combustion to combine with the incandescent coal in the zone to add to the temperature of the zone and generate $CO_2$ then causing the aggregate temperature of the zone to disassociate the $CO_2$ of the products of combustion as well as the $CO_2$ produced within the zone to produce in combination with free carbon, $2CO$.

6. The herein described process of producing CO and for the prevention of clinker in a gas producer, which consists in transmitting through the coal in a producer, highly heated waste products of combustion together with air, and simultaneously transmitting across the coal in the producer currents of electricity in sufficient magnitude to heat the coal in a zone of the producer to the required temperature to disassociate $CO_2$ and regulating such temperature by varying the amount of air.

7. The herein described process of producing CO, which consists in creating a zone of high temperature in a body of coal contained in a producer by the action of the high temperature of waste furnace gases and that due to the passage of an electric current between electrodes so disposed as to use the coal of the zone as a resistance medium, disassociating the $CO_2$ of the hot products of combustion passing through said heated zone, employing the endothermic action resulting from the decomposition of $CO_2$ into $2CO$ to lower the temperature in said zone, disassociating the coal above the heated zone to separate C, and introducing the required oxygen.

In testimony whereof, I affix my signature, in the presence of two witnesses.

GEORGE HILLARD BENJAMIN.

Witnesses:
HELEN E. KOELSCH,
ELI WEILL.